United States Patent
Ginestra et al.

(10) Patent No.: US 9,039,891 B2
(45) Date of Patent: May 26, 2015

(54) HIGH SURFACE AREA COMPOSITION FOR USE IN THE CATALYTIC HYDROCONVERSION OF A HEAVY HYDROCARBON FEEDSTOCK, A METHOD MAKING SUCH COMPOSITION AND ITS USE

(71) Applicant: SHELL OIL COMPANY, Houston, TX (US)

(72) Inventors: Josiane Marie-Rose Ginestra, Richmond, TX (US); John George Kester, The Woodlands, TX (US); David Andrew Komar, Magnolia, TX (US); David Edward Sherwood, Jr., Spring, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 14/197,292

(22) Filed: Mar. 5, 2014

(65) Prior Publication Data

US 2014/0183099 A1 Jul. 3, 2014

Related U.S. Application Data

(62) Division of application No. 13/718,679, filed on Dec. 18, 2012, now Pat. No. 8,709,968, which is a division of application No. 12/572,097, filed on Oct. 1, 2009, now Pat. No. 8,372,268.

(60) Provisional application No. 61/162,691, filed on Mar. 24, 2009.

(51) Int. Cl.

| | | |
|---|---|---|
| *B01J 23/28* | (2006.01) | |
| *B01J 23/883* | (2006.01) | |
| *B01J 27/19* | (2006.01) | |
| *B01J 35/10* | (2006.01) | |
| *B01J 37/00* | (2006.01) | |
| *B01J 37/08* | (2006.01) | |
| *C10G 45/60* | (2006.01) | |
| *C10G 47/04* | (2006.01) | |
| *C10G 47/12* | (2006.01) | |
| *B01J 23/24* | (2006.01) | |
| *B01J 27/047* | (2006.01) | |
| *B01J 27/051* | (2006.01) | |

(52) U.S. Cl.
CPC ............... *B01J 23/883* (2013.01); *B01J 27/19* (2013.01); *B01J 35/1019* (2013.01); *B01J 35/1042* (2013.01); *B01J 35/1047* (2013.01); *B01J 35/108* (2013.01); *B01J 37/0009* (2013.01); *B01J 37/08* (2013.01); *C10G 45/60* (2013.01); *C10G 47/04* (2013.01); *C10G 47/12* (2013.01); *C10G 2300/70* (2013.01)

(58) Field of Classification Search
CPC .......... B01J 23/24; B01J 23/28; B01J 27/047; B01J 27/051; B01J 27/0515
USPC .......................... 502/305, 313, 315, 325, 337
See application file for complete search history.

(56) References Cited

U.S. PATENT DOCUMENTS

| | | |
|---|---|---|
| 3,692,858 A | 9/1972 | Brewer et al. |
| 3,900,427 A | 8/1975 | Riley et al. |
| 5,002,919 A | 3/1991 | Yamazaki et al. |
| 5,047,142 A | 9/1991 | Sherwood, Jr. et al. |
| 5,089,463 A | 2/1992 | Johnson |
| 5,177,047 A | 1/1993 | Threlkel |
| 5,205,923 A | 4/1993 | De Souza et al. |
| 5,221,656 A | 6/1993 | Clark et al. |
| 5,389,595 A | 2/1995 | Simpson et al. |
| 5,498,586 A | 3/1996 | Dai et al. |
| 5,514,273 A | 5/1996 | Sherwood, Jr. et al. |
| 5,545,602 A | 8/1996 | Nelson et al. |
| 5,616,530 A | 4/1997 | Sherwood, Jr. et al. |
| 5,827,421 A | 10/1998 | Sherwood, Jr. |
| 5,928,499 A | 7/1999 | Sherwood, Jr. et al. |
| 5,968,348 A | 10/1999 | Sherwood, Jr. |
| 6,030,915 A | 2/2000 | de Boer |
| 6,127,299 A | 10/2000 | de Boer et al. |
| 6,136,179 A | 10/2000 | Sherwood, Jr. et al. |
| 6,387,248 B2 | 5/2002 | Sherwood, Jr. et al. |
| 6,780,817 B1 | 8/2004 | Koyama et al. |
| 7,265,075 B2 | 9/2007 | Tsukada et al. |
| 2005/0101480 A1 | 5/2005 | Ackerman et al. |
| 2008/0085225 A1 | 4/2008 | Bhan et al. |
| 2008/0135453 A1 | 6/2008 | Bhan |
| 2010/0269990 A1 | 10/2010 | Dottori et al. |

FOREIGN PATENT DOCUMENTS

| | | |
|---|---|---|
| EP | 1060794 | 12/1999 |
| JP | 2004115581 | 4/2004 |
| WO | 0033957 | 6/2000 |
| WO | 2008016969 | 2/2008 |
| WO | 2010002699 | 1/2010 |

*Primary Examiner* — Brian McCaig
(74) *Attorney, Agent, or Firm* — Charles W. Stewart

(57) ABSTRACT

A catalyst composition that is especially useful in the hydroconversion of pitch, micro carbon residue and sulfur contents of a heavy hydrocarbon feedstock without the excessive formation of sediment. The catalyst composition is a reasonably high surface area composition containing alumina and a low molybdenum content with a high ratio of nickel-to-molybdenum. The catalyst composition further has a unique pore distribution that in combination with the special metals loading provide for good conversion of pitch and micro carbon residue without an excessive yield of sediment.

16 Claims, No Drawings

HIGH SURFACE AREA COMPOSITION FOR USE IN THE CATALYTIC HYDROCONVERSION OF A HEAVY HYDROCARBON FEEDSTOCK, A METHOD MAKING SUCH COMPOSITION AND ITS USE

This application is a divisional of U.S. application Ser. No. 13/718,679, filed Dec. 18, 2012, which has now granted as U.S. Pat. No. 8,709,968, which is a divisional of U.S. application Ser. No. 12/572,097, filed Oct. 1, 2009, which has now granted as U.S. Pat. No. 8,372,268, which application claims the benefit of U.S. Provisional Application No. 61/162,691, filed Mar. 24, 2009, the entire disclosure of which is hereby incorporated by reference.

The invention relates to a composition that is useful as a catalyst for the catalytic hydroconversion of heavy hydrocarbon feedstocks, a method of making such a composition and its use.

There is an ongoing effort to find improved catalyst compositions that may suitably be used in hydroprocessing of heavy hydrocarbon feedstocks. A desirable property of these catalyst compositions includes having high stability in catalytic activity when used in the hydroprocessing of heavy hydrocarbon feedstocks. When these catalysts are used for the hydroconversion of heavy hydrocarbon feedstocks, it is desirable for them to provide for a high conversion of the pitch component, which is a heavy boiling fraction of the heavy hydrocarbon feedstock, to lighter and more valuable components. This conversion of the heavy boiling fraction of a heavy hydrocarbon feedstock requires consumption of hydrogen.

Disclosed in U.S. Pat. No. 5,616,530 (Sherwood, Jr. et al.) is an impregnated, alumina supported catalyst composition for use in the hydroprocessing of a heavy hydrocarbon feedstock. The catalyst includes an alumina support that is impregnated with a Group VIII metal (e.g., nickel) and a Group VIB metal (e.g., molybdenum) and has a specified pore size distribution. The pore size distribution of the catalyst is such that from 50% to 62.8% of the total pore volume is present in the micropores of diameter from 55 to 115 Å and from 20% to 30.5% of the total pore volume is present in the macropores of diameter greater than about 250 Å. Present in the large macropores of diameter from 500 to 10,000 Å is from about 18 to 24% of the total pore volume. The metal loadings of the catalyst include a non-cobalt Group VIII metal oxide in an amount of from 2.5 to 6 wt. % and a Group VIB metal oxide in an amount of from 14.5 to 24 wt. %.

Disclosed in U.S. Pat. No. 5,498,586 (Dai and Sherwood, Jr.) is a catalyst composition consisting essentially of a porous alumina support bearing 3 to 6 wt. % of a Group VIII metal oxide, 14.5 to 24 wt. % of a Group VI-B, and 0 to 6 wt. % of a phosphorus oxide for use in the hydroprocessing of a heavy hydrocarbon feedstock. The catalyst has a total pore volume of 0.5 to 0.75 cubic centimeters per gram (cc/g) and a specified pore size distribution. The pore size distribution of the catalyst is such that from 63% to 78% of the total pore volume is present in the micropores of diameter from 55 to 115 Å, from 0.12 cc/g to 0.16 cc/g of the total pore volume is present in large pores of a diameter greater than 160 Å and from 11% to 18% of the total pore volume is present in the macropores of diameter greater than about 250 Å. The total surface area of the catalyst is 240 square meters per gram (m²/g) to 310 m²/g.

U.S. Pat. No. 6,387,248 (Sherwood, Jr. et al.) discloses a relatively low surface area catalyst composition having a specific pore size distribution and is made by co-mulling alumina, Group VIII metal salt and Group VIB metal salt and forming an extrudate of the mixture that is subjected to a relatively low temperature hydrothermal calcination. The hydrothermal calcination is conducted in an atmosphere of air and steam and at a temperature of from about 1000° F. to 1150° F. The catalyst contains from about 1.1 to about 6 wt % nickel oxide and from about 5 to about 24 wt % molybdenum oxide. The pore size distribution of the catalyst is such that less than about 20% of the total pore volume is as micropores of diameter less than about 100 Å, at least about 34% of the total pore volume is as micropores of diameter in the range of from about 100 Å to 200 Å, and from about 26% to 46% of the total pore volume is present as mesopores of diameter greater than or equal to 200 Å. The catalyst has a total surface area of 150 to 240 m²/g.

It is desirable for certain hydroprocessing catalysts to provide for the high conversion of the coke precursors of heavy hydrocarbon feedstocks, which are typically referred to as "Micro Carbon Residue," or MCR, in order to prevent or reduce fouling of downstream process equipment and to provide other benefits. It is undesirable in the hydroconversion processes to form sediment in the conversion product, and, thus, a catalyst composition that provides for the high conversion of a heavy feedstock without incremental formation of sediment in the hydroconverted product is a much-desired property of the catalyst and of the process.

Accordingly, the inventive composition is a catalyst that has especially useful properties in the hydroconversion of heavy hydrocarbon feedstocks. This catalyst composition comprises a molybdenum component in an amount of less than 11 wt. %, with the wt. % being based on the total weight of said catalyst composition and assuming said molybdenum component is in the oxide form ($MoO_3$) regardless of its actual form, and a nickel component present in an amount such that said catalyst composition has a weight ratio of said nickel component-to-said molybdenum component exceeding 0.25, with said weight ratio being computed assuming said nickel component and said molybdenum component are each in the oxide form (i.e., $NiO/MoO_3$) regardless of their actual forms, and wherein said catalyst composition has a total surface area in the range of from 240 m²/g to 360 m²/g, a total pore volume of at least 0.65 cc/g and a pore size distribution such that at least 10% of the total pore volume is present in macropores of diameter greater than about 250 Å.

The catalyst composition of the invention in one embodiment is made by a method comprising mixing alumina powder, a nickel compound, and a molybdenum compound to provide a co-mulled mixture, comprising said nickel compound, said molybdenum compound and alumina; forming an agglomerate of said co-mulled mixture; and calcinating said agglomerate in air without added steam under calcination conditions that include a calcination temperature exceeding 1150° F. to thereby provide said catalyst composition, wherein said catalyst composition contains a molybdenum component present therein in an amount of less than 11 wt. %, with the wt. % being based on the total weight of said catalyst composition and assuming said molybdenum component is in the oxide form ($MoO_3$) regardless of its actual form, and a nickel component present in said catalyst composition in an amount such that said catalyst composition has a weight ratio of said nickel component-to-said molybdenum component exceeding 0.25, with said weight ratio being computed assuming said nickel component and said molybdenum component are each in the oxide form regardless of their actual forms, and wherein said catalyst composition has a total surface area in the range of from 240 m²/g to 360 m²/g.

The catalyst composition of the invention can be used in a process for the hydroconversion of a heavy hydrocarbon feedstock, wherein said process comprises: contacting, under suitable hydroconversion conditions, said heavy hydrocarbon feedstock with the catalyst composition.

The inventive catalyst composition is particularly useful in the hydroconversion of heavy hydrocarbon feedstocks. It has a high activity toward the conversion of the pitch portion and the micro carbon residue (MCR) content of a heavy hydrocarbon feedstock while minimizing undesirable formation of sediment when the catalyst is used in the catalytic hydroconversion of the heavy hydrocarbon feedstock.

One feature of the inventive catalyst composition is that it is a calcined particle, such as an agglomerated particle formed by, for example, extrusion, pressing or balling techniques, of a co-mulled mixture of components that make up the catalyst composition. The components of the co-mulled mixture can comprise or consist essentially of alumina powder or powders, a nickel compound, a molybdenum compound, and, optionally, either phosphorus or catalyst fines, or both. In the preparation of the co-mulled mixture, water or acid, or both, may also be co-mulled with the components and included as a component of the co-mulled mixture.

An important and essential feature of the inventive catalyst composition is that it has relatively low molybdenum content but with a high weight ratio of nickel-to-molybdenum (calculated as $NiO/MoO_3$ regardless of their actual forms). The inventive catalyst further has a relatively high surface area and a specifically defined pore size distribution that, in combination with the particular metal loadings of the catalyst composition, can contribute to its catalytic properties of providing for high pitch and MCR conversion with a minimal amount of sediment formation.

It has surprisingly been found that the inventive catalyst composition, having a low molybdenum concentration and a high weight ratio of nickel-to-molybdenum, and those embodiments of the catalyst composition that have the particularly defined physical properties and pore structure, exhibits particularly good hydroconversion catalytic properties. For instance, as mentioned above, the catalyst composition provides for a high conversion of pitch and MCR, and it also does this with a minimal amount of sediment formation. This particularly good catalytic performance of the low molybdenum content catalyst composition is unexpected; because, one skilled in the art would normally expect to observe a decline in catalytic performance with a decrease in the molybdenum content. This, however, is not observed with the inventive catalyst composition.

Also, concerning the high nickel content of the catalyst composition relative to its molybdenum content, it has typically been viewed that catalyst performance tends to suffer with excessively high nickel content relative to the molybdenum content. The inventive catalyst composition, however, includes both features in order to provide for the catalytic benefits as described herein.

In one embodiment of the inventive catalyst composition, it is to have a specifically defined pore size distribution that can be characterized as being bimodal in structure. It is believed that the particular pore structure of the catalyst composition in combination with its specifically defined metal loadings provides for the high pitch and MCR conversions with minimal formation of undesirable sediment.

One preferred embodiment of the inventive catalyst composition is the non-impregnated form of the catalyst. This embodiment of the inventive catalyst is non-impregnated in the sense that it is not made by the liquid phase impregnation of a preformed support material for the purpose of incorporating the active metal components therein. Rather, in this embodiment, the inventive catalyst composition is a co-mulled mixture of the principal components of the catalyst composition, wherein the co-mulled mixture has been calcined at a relatively high calcination temperature in a gaseous atmosphere, such as air, that has had no significant addition of steam to the gaseous atmosphere.

In this embodiment, the co-mulling of the main components of the catalyst composition provides several benefits over the preparation of a catalyst by impregnation methods. One of these benefits is that the co-mulled catalyst composition is more economical to make than an impregnated catalyst; because, several of the manufacturing steps required for making an impregnated catalyst are not required for making the co-mulled catalyst. For instance, an impregnated catalyst requires the formation of a support particle that often must also be calcined prior to its impregnation with metals. Once the support is impregnated with metals, it is then, typically, calcined a second time.

The co-mulled catalyst composition of the invention, on the otherhand, does not require an impregnation step nor does it require the prior preparation of the support particle. A still further benefit of the co-mulled catalyst composition is that the co-mulling may contribute in some way to certain of the beneficial properties of the inventive catalyst composition.

The molybdenum component is present in the calcined agglomerate of the catalyst composition in an amount that is greater than or equal to 5 wt. % and in an amount that is less than 11 wt. %. It is desirable for the molybdenum component to be present in the calcined agglomerate in an amount in the range of from 6 wt. % to 11 wt. %. It is preferred, however, for the molybdenum component to be present in the calcined agglomerate in an amount in the range of from 7.5 wt. % to 11 wt. %, more preferred, in the range of from 8 wt. % to 10 wt. %, and, most preferred, from 8.5 wt. % to 9.5 wt. %. These weight percents (wt. %) are based on the total weight of the calcined agglomerate (i.e., the total weight includes the sum of all the individual components of the catalyst composition including the support material, metals, and any other components) and assuming that the molybdenum component is present in the oxide form, i.e., $MoO_3$, regardless of its actual form.

The nickel component is present in the calcined agglomerate of the catalyst composition in an amount such that the weight ratio of the nickel component-to-molybdenum component is at least 0.25, with this weight ratio being computed assuming each of the nickel and molybdenum components being in their respective oxide forms (i.e., the weight ratio of $NiO/MoO_3$), regardless of their actual forms. It is desirable for this weight ratio to be in the range of from 0.25 to 0.8. Preferably, the weight ratio of the nickel component-to-molybdenum component contained in the calcined agglomerate is in the range of from 0.27 to 0.52, and, most preferably, the weight ratio is from 0.34 to 0.42.

As noted above, the nickel-to-molybdenum ratio contained in the inventive catalyst composition is high. It is believed that the combination of low molybdenum content and high nickel-to-molybdenum ratio are critical features of the catalyst composition in that they, in combination with the specific pore structure and high surface area of the catalyst composition, provide for the unique catalytic performance properties of the inventive catalyst. It is quite unexpected that the combination of these features provides for a catalyst composition that is very active toward the high conversion of pitch and MCR of a heavy hydrocarbon feedstock but which causes a correspondingly low amount of sediment formation; since, those skilled in the art would have thought that a reduction in molybdenum content would tend to result in a less catalytically active catalyst and that a high relative nickel content would tend to interact with the molybdenum at the atomic and molecular levels in undesirable ways.

The catalyst composition may also include a phosphorous component. The amount of the phosphorous component in the catalyst composition can be in the range of from or about 0.0 wt. % to or about 6 wt. % (2.63 wt. % elemental phosphorous). Typically, the phosphorous component is present in the catalyst composition in the range of from 0.5 wt % (0.22 wt. % elemental phosphorous) to 5 wt. % (2.19 wt. % elemental phosphorous), and, most typically, from 0.75 (0.33 wt. % elemental phosphorous) to 4 wt % (1.75 wt. % elemental phosphorous). These weight percents (wt. %) are based on the total weight of the catalyst composition and assuming that the phosphorous component is present in the oxide form, i.e., $P_2O_5$, regardless of the form that it is actually in.

As noted above in describing the critical features of the catalyst composition, nickel is a necessary component of the catalyst composition, and, in certain embodiments of the inventive catalyst composition, it may further be desirable to exclude material amounts of certain of the other Group VIII metals (e.g., iron, cobalt, palladium, and platinum). In particular, in one specific embodiment of the inventive catalyst composition, it is desirable for the catalyst composition to have a material absence of cobalt. What is meant by having a material absence of cobalt is that the catalyst composition contains no amount of cobalt that materially affects the performance of the catalyst composition.

Since it is believed that the significant presence of cobalt in the catalyst composition with its low molybdenum content and high weight ratio of nickel-to-molybdenum can negatively impact the catalytic effectiveness of the catalyst composition when it is used in applications involving the conversion of the pitch content of a heavy hydrocarbon feedstock, the cobalt should be absent from the catalyst composition. Thus, it is best for the cobalt to be present in the catalyst composition in an amount of no more than 0.1 wt. %, preferably, in an amount of no more than 0.05 wt. %, and, even in an amount of no more than 0.01 wt. %, or even in a negligible amount.

Considering the effect that cobalt and certain other of the Group VIII metals may have on the performance of the inventive catalyst composition, the catalyst composition, as an alternative to one that comprises a molybdenum component, a nickel component, and alumina, may consist essentially of alumina, a molybdenum component, a nickel component, and, optionally, a phosphorous component, all in the proportions and concentrations as described herein.

The catalyst composition of the invention has a relatively high total surface area, as determined by the nitrogen BET method, which is in the range of from 240 $m^2/g$ to 360 $m^2/g$. A preferable range for the total surface area of the catalyst is from 250 $m^2/g$ to 350 $m^2/g$, and, a more preferable range is from 260 $m^2/g$ to 300 $m^2/g$.

As earlier mentioned, the catalyst composition has a specifically defined pore structure that, in combination with the particular metal loadings and other features of the catalyst composition, provides for the minimization of the formation of sediment when used in the hydroconversion of a heavy hydrocarbon feedstock. This pore structure is such that from 50% to 80% of the total pore volume of the catalyst is present as pores having a diameter in the range of from 55 Å to 115 Å, from 19.5% to 37% of the total pore volume of the catalyst is present as pores having diameters of greater than or equal to 160 Å, and from 11% to 30.5% of the total pore volume of the catalyst is present as pores having diameters of greater than or equal to 250 Å. In an embodiment of the invention, from 16% to 30% of the total pore volume of the catalyst may be present as pores having diameters greater than 500 Å, preferably, from 18% to 28% of the total pore volume is present as pores having diameters greater than 500 Å, and, most preferably from 19% to 26% of the total pore volume is present as pores having diameters greater than 500 Å.

It is preferred for the percentage of total pore volume present as pores of diameter in the range of from 55 Å to 115 Å to be in the range of from 55% to 70%, and, most preferred, from 50% to 62.8%.

As for the percentage of the total pore volume present as pores having diameters of greater than or equal to 160 Å, it is preferred to be in the range of from 15.3% to 37%, and, most preferred, from 27.5% to 37%.

As for the percentage of the total pore volume present as pores of having diameters of greater than or equal to 250 Å, it is preferred to be in the range of from 11.8% to 30.5%, and, most preferred, from 20% to 30.5%. The total pore volume of the catalyst composition is, generally, at least or greater than 0.65 cc/g, and, typically is in the range of from 0.65 cc/g to 1.1 cc/g. More typically, the total pore volume is in the range of from 0.7 cc/g to 1.05 cc/g, and, most typically, it is in the range of from 0.75 cc/g to 1 cc/g.

The references herein to the pore size distribution and pore volume of the catalyst composition are to those properties as determined by mercury penetration porosimetry. The measurement of the pore size distribution of the catalyst composition is by any suitable mercury porosimeter capable of working in the pressure range between atmospheric pressure and about 60,000 psi, using a contact angle of 130° with a mercury surface tension of 474 dyne/cm at 25° C. Pore volume is defined as the total volume using the mercury intrusion method as measured between atmospheric pressure and a pressure of about 60,000 psia.

In the co-mulled embodiment of the inventive catalyst composition, the co-mulled mixture of the starting materials or components of the catalyst composition includes the components of alumina powder, a nickel compound and a molybdenum compound. The starting components may also include a phosphorus compound or catalyst fines, or both, in addition to the aforementioned alumina, nickel and molybdenum as well as water or acid, or both. The nickel compound may be introduced into the co-mulled mixture as an aqueous solution of a nickel salt. The molybdenum compound may also be introduced into the co-mulled mixture as an aqueous solution of a molybdenum salt. A single solution containing both the nickel compound and molybdenum compound may also be employed.

The co-mulled mixture is formed into particles, such as extrudates, that are then calcined in air at a calcination temperature within a certain range to thereby provide the final catalyst composition. It is believed that this co-mulling may provide for a final catalyst having catalytic or physical, or both, properties that are distinguishable over those of other hydroprocessing catalysts that have been prepared by a different method, such as, for example, by impregnation.

The term "co-mulling" is used broadly in this specification to mean that at least the recited starting materials are mixed together to form a mixture of the individual components that is preferably substantially uniform or homogeneous. This term is intended to be broad enough in scope to include the mixing of the starting materials so as to yield a paste that exhibits properties making it capable of being extruded or formed into extrudate particles by any of the known extrusion methods.

The term "co-mulling" is also intended to encompass the mixing of the starting materials so as to yield a mixture that is preferably substantially homogeneous and capable of being agglomerated into formed particles, such as, extrudates, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling. The preferred method of agglomerating the mixture is by extrusion to form extrudate particles, typically, having diameters in the range of from 0.3969 mm (1/64 inch) or 0.79375 mm (1/32 inch) to 12.7 mm (1/2 inch) and length to diameter ratios of from 0.2 to 3 or even higher.

Thus, the formation of the co-mulled mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable.

Suitable types of batch mixers include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of starting materials used in the preparation of the co-mulled mixture may be conducted during any suitable time period necessary to properly homogenize the co-mulled mixture. Generally, the blending time may be in the range of upwardly to 12 or more hours. Typically, the blending time is in the range of from 0.1 hours to 3 hours.

The alumina powder component used in the formation of the co-mulled mixture comprises particles of alumina. The alumina is preferably predominantly in the pseudo-boehmite crystalline form ($Al_2O_3 \cdot xH_2O$ where x is an intermediate value between x=1 boehmite and x=3 gibbsite), with about 20 wt. % to 30 wt. % water content, and is characterized as having a median pore diameter by surface area from mercury porosimetry (with a contact angle of 140 degrees) in the range of from about 60 Å to about 120 Å. The alumina is in a reasonably divided state so as to be in the form of a powder (when dry) that allows for its co-mulling or mixing with the metal compounds, water and other constituents that make up the co-mulled mixture of the invention.

The alumina powder component may contain silica and, if silica is present, it is preferred for the alumina to contain less than 2 wt. % silica, and, most preferred, less than 1 wt. % silica. The alumina is in a reasonably divided state so as to be in the form of a powder (when dry) that allows for its co-mulling or mixing with the metal compounds, water and other constituents that make up the co-mulled mixture of the invention.

The alumina particles of the alumina powder may be described in terms of mesh size with most of the particles, i.e. at least 90 wt. % of the particles, being able to pass through the mesh of a sieve No. 35 (nominal sieve opening of 0.500 mm) and most of the particles, i.e., at least 90 wt. % of the particles, not being able to pass through or being retained by the mesh of a sieve No. 400 (nominal sieve opening of 0.037 mm).

The nickel compound used in the preparation of the co-mulled mixture is any suitable nickel compound that is convertible to a nickel oxide form by calcination in air under the calcination conditions as defined herein. Possible suitable nickel compounds include nickel oxides, nickel carbonates, nickel hydroxides, and nickel nitrates. One particularly suitable nickel compound is nickel nitrate.

The molybdenum compounds used in the preparation of the co-mulled mixture can be molybdenum oxide and any other suitable molybdenum compound that is convertible to a molybdenum oxide form by calcination in air under the calcination conditions as defined herein. Possible suitable molybdenum compounds include molybdenum oxides, molybdenum oxide hydrates and molybdates. One particularly suitable molybdenum compound is ammonium heptamolybdate.

To help control the macroporosity (as defined elsewhere herein) of the catalyst composition, in one embodiment of the invention, the fines of an already prepared hydroprocessing catalyst, that is preferably a fresh or unused hydroprocessing catalyst, that contains nickel, molybdenum and phosphorous components supported on an alumina support is mixed or co-mulled along with the alumina powder, the nickel compound, the molybdenum compound, and, optionally, the phosphorus compound, acid and water that form the co-mulled mixture. Fines from other types of catalysts or alumina supports may also be employed, including used hydroprocessing catalyst that has been regenerated in full or in part or not at all.

The fresh hydroprocessing catalyst from which the catalyst fines are prepared may be selected from commercially available hydroprocessing catalyst products, which include typical impregnated catalysts, or it may be obtained from the processing of the co-mulled catalyst composition of the instant invention. The hydroprocessing catalyst from which the catalyst fines are derived generally has a Group VI-B hydrogenation metal content in the range of from 1 to 35 wt. %, calculated as trioxide (e.g., $MoO_3$), a Group VIII hydrogenation metal content in the range of from 1 to 10 wt. %, calculated as oxide (e.g., NiO), and, optionally, a phosphorus content in the range upwardly to 10 wt. %, calculated a $P_2O_5$. The hydroprocessing catalyst fines generally have a mean pore diameter in the range of from 40 Å to 150 Å.

To prepare the catalyst fines used in the blending with the other components of the co-mulled mixture, the material (e.g., hydroprocessing catalyst) is ground into a powder containing catalyst particles wherein at least 90 wt. % are able to pass through the mesh of a sieve No. 40 (nominal sieve opening of 0.420 mm) Any suitable equipment known to those skilled in the art that is capable of grinding the material into particles to form a powder may be used to prepare the catalyst fines with average particle size between 5 and 50 microns (where one micron=$10^{-6}$ meters). An example of one such piece of equipment is a conventional hammer mill.

The amount of catalyst fines mixed with the other components of the co-mulled mixture is such as to help control the macroporosity of the final catalyst composition of the invention to within the desired ranges as described herein. Thus, the amount of catalyst fines contained in the co-mulled mixture can be in the range upwardly to 50 weight percent (i.e., from 0 wt. % to 30 wt. %) of the total weight, on a dry basis, of the alumina powder or powders and catalyst fines that make up the catalyst. In other embodiments of the invention, the co-mulled mixture may have from 1 wt. % to 40 wt. % catalyst fines based on the total weight of the alumina powder and/or other powders of the catalyst, or even from 5 wt. % to 30 wt. %.

The particles formed by agglomerating the co-mulled mixture are calcined in air under suitable calcination conditions so as to provide the final catalyst composition of the invention. The calcination conditions should be such as to convert the nickel and molybdenum compounds of the co-mulled mixture and agglomerate to oxide forms and to provide a final catalyst composition having the desired physical properties as described herein.

The calcination of the agglomerate formed from the co-mulled mixture, preferably, should not be a hydrothermal-type calcination, which is an exposure of the agglomerate to an atmosphere of air with a significant presence of steam at a reasonably high temperature. Rather, the calcination of the agglomerate should be in the presence of an air atmosphere having no material or significant addition of steam. Thus, the calcination of the agglomerate may be conducted in an atmosphere of air that has a concentration level of water that is typically observed in air at standard conditions, but there should be no material addition of water to the heated air beyond that which is naturally contained in air.

A material addition of water is an amount of water that is added to the heated air used in the calcination of the agglomerate that would materially affect the final properties of the calcined agglomerate or final catalyst composition of the invention.

An example of air that may suitably be used in the calcination of the agglomerate of the co-mulled mixture is air that is saturated with water at a temperature of 60° F. and 1 atmosphere of pressure.

The calcination temperature should exceed 621° C. (1150° F.). The preferred range for the calcination temperature is from 635° C. (1175° F.) to 927° C. (1700° F.), and, a more preferred range for the calcination temperature is from 649° C. (1200° F.) to 815° C. (1500° F.). The most preferred calcination temperature is in the range of from 663° C. (1225° F.) to 815° C. (1500° F.).

The heavy hydrocarbon feedstock of the invention can be obtained from any suitable source of hydrocarbons, including, for example, petroleum crude oils and tar sand hydrocarbons, such as, heavy oils extracted from tar sand. The heavy hydrocarbon feedstock can be a vacuum resid or atmospheric resid component of a petroleum crude oil or tar sand hydrocarbon. One potential source of the heavy hydrocarbon feedstock is from an oil sand, such as any of those that are recovered in many areas of Canada, that have been topped by atmospheric distillation and vacuum distilled.

The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydroprocessing so challenging.

The heavy hydrocarbon feedstock, thus, includes a mixture of hydrocarbons derived from a crude oil or tar sand hydrocarbon material or other source of heavy hydrocarbons. A major portion of the heavy hydrocarbons of the mixture has a boiling temperature exceeding about 343° C. (650° F.). In addition, a portion, preferably a major portion, of the heavy hydrocarbons of the mixture has a boiling temperature exceeding about 538° C. (1000° F.). The preferred heavy hydrocarbon feedstock has a boiling range such that at least 50 weight percent boils at a temperature exceeding 538° C. (1000° F.), and, most preferably, at least 85 weight percent of the heavy hydrocarbon feedstock boils at a temperature exceeding 538° C. (1000° F.). The boiling ranges referenced herein are as determined by ASTM test procedure D-1160. The API gravity of the heavy hydrocarbon feedstock can range from about 0 to about 20, but, more specifically, the API gravity is in the range of from 3 to 15, and, more specifically, from 4 to 11.

The heavy hydrocarbon feedstock can also have a micro carbon residue (MCR) content, as determined by ASTM testing method D-4530, exceeding 10 weight percent, and, more specifically, the MCR content exceeds 12 weight percent, and, most specifically, it exceeds 14 weight percent. A potential upper limit for the MCR content is less than 40 weight percent.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 2 to 10 weight percent, or from 4 to 10 weight percent.

The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.2 to 3 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 10 parts per million by weight (ppmw) to 500 ppmw, or from 40 to 500 ppmw.

The vanadium concentration in the heavy hydrocarbon feedstock can exceed 50 ppmw or it can exceed 100 ppmw. More specifically, the vanadium concentration in the heavy hydrocarbon feedstock can be in the range of from 50 ppmw to 1500 ppmw.

The process of the invention includes contacting the heavy hydrocarbon feedstock, preferably in the presence of hydrogen, with the catalyst composition of the invention under suitable hydroprocessing conditions. The inventive process provides for an exceptionally high percentage conversion of the pitch, MCR and sulfur contents of the heavy hydrocarbon feedstock.

While it is recognized that the term "pitch" may have different definitions by and among hydroprocessing operators depending upon their experience and local custom, as the term is used in this specification, except as otherwise specified, and in the claims it refers to the hydrocarbon molecules contained in the fraction of the heavy hydrocarbon feedstock that boil at temperatures above 538° C. (1000° F.). The references herein to "pitch conversion" or similar references to the conversion of pitch, except as otherwise specified, are speaking of the cracking of the heavy hydrocarbon molecules that make up the pitch component of the heavy hydrocarbon feedstock to smaller hydrocarbon molecules that boil at temperatures below 538° C. (1000° F.).

The percent conversion of pitch is then defined as being the weight percent of the pitch contained in the heavy hydrocarbon feedstock that is converted by the hydroconversion process, and it can be represented by the ratio of the difference between the weight of pitch in a feed and the weight of pitch in the product with the resulting difference being divided by the weight of pitch in the feed and the resulting ratio being multiplied by 100 to provide the percentage pitch conversion.

The percent conversion of MCR is defined as being the weight percent of MCR contained in the heavy hydrocarbon feedstock that is converted by the hydroconversion process, and it can be represented by the ratio of the difference between the MCR in a feed and the MCR in the product with the resulting difference being divided by the MCR in the feed and the resulting ratio being multiplied by 100 to provide the percentage MCR conversion.

The percent sulfur conversion is defined in a similar manner as are the pitch conversion and MCR conversion in that it is the weight percent of sulfur that is contained in the heavy hydrocarbon feedstock that is converted by the hydroconversion process. Sulfur conversion can be represented by the ratio of the difference between the weight of sulfur in a feed and the weight of sulfur in the product with the resulting difference being divided by the weight of sulfur in the feed and resulting ratio being multiplied by 100 to provide the percentage sulfur conversion.

The hydroconversion process can be carried out by the use of any suitable reaction means or system including fixed bed, moving bed, fluidized bed and ebullated bed reactor systems. While the inventive catalyst composition can be used as a part of any suitable reactor system, its properties make it particularly suitable for use in ebullated bed systems.

The hydroprocessing conditions under which the heavy hydrocarbon feedstock is contacted with the hydroconversion catalyst composition of the invention include those process conditions that are effective in providing for a hydrotreated product and, preferably, that are effective in the conversion of a significant portion of the pitch and MCR components of the heavy hydrocarbon feedstock but with a minimum formation of sediment.

The conversion of the pitch component can exceed about 50 weight percent of the pitch. A higher pitch conversion is desirable and, thus, preferably, pitch conversion exceeds 55 weight percent, and, most preferably, pitch conversion exceeds 60 weight percent.

Sediment is considered herein to be that as measured by testing a sample by the Shell Hot Filtration Test (SHFT). See *Jour. Inst. Pet.* (1951), Vol. 37, pages 596-604, "Determination of Dry-Sludge Content of Fuel Oils: Development of the Shell Hot Filtration Test (SHFT), by van Kerkvoort et al., which is incorporated herein by reference. The sediment content of the hydroconversion product resulting from the hydroprocessing of the heavy hydrocarbon feedstock using the inventive catalyst composition is typically lower than that expected for conventional hydroprocessing catalyst.

Suitable hydroprocessing conditions under which the heavy hydrocarbon feedstock is contacted with the hydroconversion catalyst composition of the invention can include a hydroconversion contacting temperature in the range of from about 300° C. (572° F.) to about 700° C. (1292° F.), a hydroconversion total contacting pressure in the range of from about 500 psia to about 6,000 psia, which includes a hydrogen partial pressure in the range of from about 500 psia to about 3,000 psia, a hydrogen addition rate per volume of heavy hydrocarbon feedstock in the range of from about 500 SCFB to about 10,000 SCFB, and a hydroconversion liquid hourly space velocity (LHSV) in the range of from about 0.2 hr$^{-1}$ to 5 hr$^{-1}$.

The preferred hydroconversion contacting temperature is in the range of from 310° C. (590° F.) to 650° C. (1202° F.), and, most preferred, from 316° C. (600° F.) to 600° C. (1112° F.). The preferred hydroconversion total contacting pressure is in the range of from 500 psia to 3,000 psia, most preferably, from 1,000 psia to 2,850 psia, with a preferred hydrogen partial pressure of from 800 psia to 2,000 psia, and most preferred, from 1,000 psia to 1,850 psia.

The LHSV is preferably in the range of from 0.2 hr$^{-1}$ to 4 hr$^{-1}$, and, most preferably, from 0.2 hr$^{-1}$ to 3 hr$^{-1}$. The hydrogen addition rate is preferably in the range of from 600 SCFB to 8,000 SCFB, and, more preferably, from 700 SCFB to 6,000 SCFB.

The unique properties of the inventive catalyst composition allow for a significant improvement in the operation of existing hydroconversion process systems by the replacement of the catalyst that has been used in such systems with the inventive catalyst composition that exhibits the above-described enhanced hydroconversion properties.

The following Examples are presented to illustrate the invention, but they should not be construed as limiting the scope of the invention.

EXAMPLE 1

This Example 1 describes the preparation of the inventive catalyst and the comparison catalysts that were tested for performance as described in Example 2.

Catalyst A

A co-mulled mixture was prepared by mixing in a muller mixer 2721.6 parts (2049.4 on a dry basis) wide pore alumina powder and 594.3 parts (563.5 on a dry basis) green catalyst fines with a molybdenum component mixture of 539.1 parts ammonium heptamolybdate (27% MoO$_3$) and 1406.2 parts water and a nickel component mixture of 333.3 parts nickel nitrate solution, 81.1 parts 70% nitric acid and 1406.2 parts water. The components where mulled for 30 minutes followed by the addition of 14.1 parts flocculant (Superfloc LMW 300) followed by another 5 minutes of mixing. The co-mulled mixture was then extruded into extrudates that were dried in air at an approximate temperature of 250° F. for about 1 hour. Thereafter, the dried extrudates were calcined in air for 1 hour at a temperature of 1370° F.

Catalyst B

A co-mulled mixture was prepared by mixing in a muller mixer 2721.6 parts (2049.4 on a dry basis) wide pore alumina powder and 579.9 parts (549.9 on a dry basis) green catalyst fines with a molybdenum component mixture of 342.8 parts ammonium heptamolybdate (27% MoO$_3$) and 1428.8 parts water and a nickel component mixture of 325.3 parts nickel nitrate solution, 79.1 parts 70% nitric acid and 1428.8 parts water. The components where mulled for 30 minutes followed by the addition of 13.7 parts flocculant (Superfloc LMW 300) followed by another 5 minutes of mixing. The co-mulled mixture was then extruded into extrudates that were dried in air at an approximate temperature of 250° F. for about 1 hour. Thereafter, the dried extrudates were calcined in air for 1 hour at a temperature of 1400° F.

Comparison Catalyst

The Comparison Catalyst was made in an analogous way to Catalysts A and B in commercial equipment. The Comparison Catalyst sample was made so as to have the same Total Surface Area and pore size distribution as the catalysts of the instant invention and the same low Mo content (calculated as MoO3) as the catalysts of the instant invention, but with a relatively low nickel oxide to molybdenum oxide ratio (calculated as NiO/MoO3) compared to the catalysts of the instant invention.

Presented in Table 1 are the metal loadings of the inventive catalysts (Catalyst A and Catalyst B) and of the Comparison Catalyst. Presented in Table 2 are the pore structure details concerning the inventive and comparison catalysts.

TABLE 1

Composition of Inventive Catalyst (Catalyst A and Catalyst B) and the comparison catalysts (Comparison Catalyst).

| Component | Comparative Catalyst | Catalyst A | Catalyst B |
|---|---|---|---|
| Ni (wt. %) | 1.54 | 2.4 | 2.4 |
| NiO (wt. %) | 2.0 | 3.0 | 3.1 |
| Mo (wt. %) | 7.17 | 6.1 | 4.8 |
| $MoO_3$ (wt. %) | 10.8 | 9.2 | 7.2 |
| $NiO/MoO_3$ (wt ratio) | 0.18 | 0.33 | 0.43 |
| P (wt. %) | 0.5 | 0.4 | 0.4 |
| $P_2O_5$ (wt. %) | 1.2 | 0.9 | 0.9 |
| Si as $SiO_2$ (wt. %) | 0.2 | 0.05 | ≤0.05 |

TABLE 2

Physical Parameters of Inventive Catalyst (Catalyst A and Catalyst B) and comparison catalyst (Comparison Catalyst).

| Property | Comparative Catalyst | Catalyst A | Catalyst B |
|---|---|---|---|
| $N_2$ surface area ($m^2$/g) | 277.3 | 271 | 272 |
| Hg Porosimetry | | | |
| % Total Pore Volume as pores 55 to 115 Å | 57.8 | 59.0 | 63.4 |
| % Total Pore Volume as pores greater than 160 Å | 33.6 | 31.3 | 28.0 |
| % Total Pore Volume as pores greater than 250 Å | 29.0 | 26.3 | 23.5 |
| Total Pore Volume (cc/g) | 0.87 | 0.90 | 0.90 |
| % Total Pore Volume as pores 250-500 Å | 3.5 | 4.0 | 3.8 |
| % Total Pore Volume as pores 50-100 Å | 49.5 | 51.3 | 57.2 |
| % Total Pore Volume as pores 100-200 | 19.4 | 19.7 | 16.7 |

EXAMPLE 2

This Example 2 describes the experimental testing procedure and conditions use to test the catalysts described in Example 1 for their hydroconversion performance.

Each of the catalysts was tested for its catalytic performance in the hydroprocessing and hydroconversion of a heavy hydrocarbon feed. The heavy hydrocarbon feed used in the performance test was Arabian Medium vacuum residue with properties as follow: density of 1.0347 g/cc; sulfur content of 5.3 wt. %; nitrogen content of 0.38 wt. %; MCR content of 20.8 wt. %; and a pitch content (pitch is defined in this Example 2 to be those hydrocarbons having a boiling temperature greater than 538° C. or 1000° F.) of 88.0 wt. %.

The tests were conducted in a simulated two-stage ebullated bed unit that consisted of two continuous stirred tank reactor (CSTR) units obtained from Autoclave Engineers and equipped with Robinson-Mahoney internals connected together in series flow. Each reactor was loaded with 51 cc of catalyst. The operating conditions included an operating pressure of about 2250 psi, an operating temperature of 424° C. (795° F.), a liquid hourly space velocity of about 0.55 cc of feed per cc of catalyst per hour, and a hydrogen-to-oil ratio of about 4100 SCF/bbl.

The following Table 3 presents the results from the testing of the Comparison Catalyst, Catalyst A and Catalyst B.

TABLE 3

Conversion Performance Results from the Testing of Inventive Catalyst and Comparison Catalyst

| | Comparative Catalyst | Catalyst A | Catalyst B |
|---|---|---|---|
| Pitch Conversion, vol. % | 72.4 | 74.8 | 67.4 |
| MCR Conversion, wt. % | 70 | 71 | 66 |
| S Conversion, wt. % | 81 | 82 | 79 |
| 343° C.+ (650° F.+) SHSFT Sediment, wt. % | 0.07 | 0.05 | 0.06 |

As may be observed from the data of Table 3, Catalyst A provides for an improvement in the conversion of pitch, micro carbon residue removal and sulfur removal while maintaining excellent control of sediment as measured by the Shell Hot Filtration Test (SHFT) on the product fraction boiling above 343° C. (650° F.). The data suggest that there is an optimum in the required nickel-to-molybdenum ratio and in the molybdenum content of the inventive catalyst.

EXAMPLE 3

This Example 3 describes the preparation of the inventive catalyst and the comparison catalysts that were tested for performance as described in Example 4.

Catalyst C

A co-mulled mixture was prepared by mixing in a muller mixer 4082.6 parts (3074.2 on a dry basis) alumina powder and 891.5 parts (845.4 on a dry basis) catalyst fines with a molybdenum component mixture of 808.8 parts ammonium heptamolybdate (27% $MoO_3$) and 2109.2 parts water and a nickel component mixture of 500.0 parts nickel nitrate solution, 121.6 parts 70% nitric acid and 2109.2 parts water. The components where mulled for 30 minutes followed by the addition of 21.1 parts flocculant (Superfloc LMW 300) followed by another 5 minutes of mixing. The co-mulled mixture was then extruded into extrudates that were dried in air at an approximate temperature of 250° F. for about 1 hour. Thereafter, the dried extrudates were calcined in air for 1 hour at a temperature of 1370° F.

Catalyst D

A co-mulled mixture was prepared by mixing in a muller mixer 2721.4 parts (2046.5 on a dry basis) alumina powder and 614.1 parts (572.6 on a dry basis) catalyst fines with a molybdenum component mixture of 576.4 parts ammonium heptamolybdate (27% $MoO_3$) and 1360.8 parts water and a nickel component mixture of 495.7 parts nickel nitrate solution, 82.4 parts 70% nitric acid and 1360.8 parts water. The components where mulled for 30 minutes followed by the addition of 14.3 parts flocculant (Superfloc LMW 300) followed by another 5 minutes of mixing. The co-mulled mixture was then extruded into extrudates that were dried in air at an approximate temperature of 250° F. for about 1 hour. Thereafter, the dried extrudates were calcined in air for 1 hour at a temperature of 1325° F.

A Second Comparison Catalyst

The Second Comparison Catalyst was made in an analogous way to Catalysts C and D in commercial equipment. The Comparison Catalyst sample was made so as to have the same Total Surface Area and pore size distribution as the catalysts of the instant invention and the same low Mo content (calculated as $MoO_3$) as the catalysts of the instant invention, but with a relatively low nickel oxide to molybdenum oxide ratio (calculated as $NiO/MoO_3$) compared to the catalysts of the instant invention.

Presented in Table 4 are the metal loadings of two inventive catalysts (Catalysts C and D) and the Second Comparison Catalyst. Presented in Table 5 are the pore structure details concerning the inventive and comparison catalysts.

TABLE 4

Composition of Inventive Catalysts C and D and the Second Comparison Catalyst.

| Component | Second Comparative Catalyst | Catalyst C | Catalyst D |
|---|---|---|---|
| Ni (wt. %) | 1.5 | 2.34 | 2.85 |
| NiO (wt. %) | 1.9 | 3.0 | 3.6 |
| Mo (wt. %) | 6.8 | 5.99 | 5.96 |
| $MoO_3$ (wt. %) | 10.2 | 9.0 | 8.9 |
| $NiO/MoO_3$ (wt ratio) | 0.19 | 0.33 | 0.41 |
| P (wt. %) | 0.48 | 0.39 | 0.57 |
| $P_2O_5$ (wt. %) | 1.1 | 0.9 | 1.3 |
| Si as $SiO_2$ (wt. %) | 0.1 | 0.26 | 0.52 |

TABLE 5

Physical Parameters of Inventive Catalysts C and D and the Second Comparison Catalyst.

| Property | Second Comparative Catalyst | Catalyst C | Catalyst D |
|---|---|---|---|
| $N_2$ surface area ($m^2/g$) | 254 | 272 | 260 |
| Hg Porosimetry | | | |
| % Total Pore Volume as pores 55 to 115 Å | 59.0 | 60.4 | 60.6 |
| % Total Pore Volume as pores greater than 160 Å | 32.6 | 30.5 | 29.7 |
| % Total Pore Volume as pores greater than 250 Å | 28.5 | 25.9 | 24.9 |
| Total Pore Volume (cc/g) | 0.87 | 0.88 | 0.87 |
| % Total Pore Volume as pores 250-500 Å | 3.3 | 3.7 | 4.0 |
| % Total Pore Volume as pores 50-100 Å | 52.5 | 54.2 | 53.2 |
| % Total Pore Volume as pores 100-200 Å | 16.7 | 17.1 | 19.3 |

EXAMPLE 4

This Example 4 describes the experimental testing procedure and conditions use to test the catalysts described in Example 3 for their hydroconversion performance.

Each of the catalysts was tested for its catalytic performance in the hydroprocessing and hydroconversion of a heavy hydrocarbon feed. The heavy hydrocarbon feed used in the performance test was a 95/5 weight per weight blend of Bitumen vacuum residue from Canadian Oil Sands and Heavy Aromatic Oil with properties as follow: density of 1.0457 g/cc; sulfur content of 5.8 wt. %; nitrogen content of 0.62 wt. %; MCR content of 18.2 wt. %; and a pitch content (pitch is defined in this Example 4 to be those hydrocarbons having a boiling temperature greater than 524° C. or 977° F.) of 91.3 wt. %.

The tests were conducted in a simulated two-stage ebullated bed unit that consisted of two continuous stirred tank reactor (CSTR) units obtained from Autoclave Engineers and equipped with Robinson-Mahoney internals connected together in series flow. Each reactor was loaded with 56 cc of catalyst. The operating conditions included an operating pressure of about 2010 psi, an operating temperature of 414° C. (778° F.), a liquid hourly space velocity of about 0.50 cc of feed per cc of catalyst per hour, and a hydrogen-to-oil ratio of about 3600 SCF/bbl.

The following Table 6 presents the results from the testing of a Second Comparison Catalyst, Catalyst C and Catalyst D. Catalysts C and D provide for an improvement in the conversion of pitch, micro carbon residue removal and sulfur removal while maintaining excellent control of sediment as measured by the Shell Hot Filtration Solids Test (SHFST) on the product fraction boiling above 390° C. (734° F.). The data confirms the advantage of the required nickel-to-molybdenum ratio.

TABLE 6

Conversion Performance Results from the Testing of the Two Additional Inventive Catalysts and Second Comparison Catalyst

| | Second Comparative Catalyst | Catalyst C | Catalyst D |
|---|---|---|---|
| Pitch Conversion, vol. % | 72.2 | 72.7 | 75.3 |
| MCR Conversion, wt. % | 71.7 | 73.8 | 74.7 |
| S Conversion, wt. % | 87.6 | 88.3 | 89.0 |
| 390° C.+ (734° F.+) SHSFT Sediment, wt. % | 0.11 | 0.01 | 0.03 |

That which is claimed is:

1. A non-impregnated catalyst composition providing for a high conversion of pitch and MCR with a minimal amount of sediment formation when used in the hydroprocessing of a heavy hydrocarbon feedstock, wherein said non-impregnated catalyst composition comprises:
alumina powder that has a material absence of phosphorus and consists essentially of alumina;
a molybdenum component in an amount of greater than or equal to 5 wt. % and less than 11 wt. %, with the wt. % being based on the total weight of said non-impregnated catalyst composition and assuming said molybdenum component is in the oxide form ($MoO_3$) regardless of its actual form;
a nickel component present in an amount such that said non-impregnated catalyst composition has a weight ratio of said nickel component-to-said molybdenum component exceeding 0.25, with said weight ratio being computed assuming said nickel component and said molybdenum component are each in the oxide form regardless of their actual forms,
wherein said non-impregnated catalyst composition has a total surface area in the range of from 240 $m^2/g$ to 360 $m^2/g$, a total pore volume in the range of from 0.65 cc/g to 1.1 cc/g and a pore size distribution such that from 11% to 30.5% of the total pore volume is present in macropores of diameter greater than or equal to 250 Å, and having a pore size distribution such that from 50% to 80% of the total pore volume of said non-impregnated catalyst composition is present as pores having diameters in the range of from 55 Å to 115 Å.

2. A non-impregnated catalyst composition as recited in claim 1, wherein more than 20% of the total pore volume of said non-impregnated catalyst composition is present in pores of diameter in the range of from 50 Å to 100 Å, and less than 30% of the total pore volume of said non-impregnated catalyst composition is present in pores of diameter in the range of from 100 Å to 200 Å.

3. A non-impregnated catalyst composition as recited in claim 2, wherein the pore structure of said non-impregnated catalyst composition is such that from 19.5% to 37% of its total pore volume of said non-impregnated catalyst composition is present as pores having diameters of greater than or equal to 160 Å.

4. A non-impregnated catalyst composition as recited in claim 3, wherein said non-impregnated catalyst composition is prepared by mixing said alumina powder, a nickel compound, and a molybdenum compound to provide a co-mulled mixture, comprising said nickel compound, said molybdenum compound and alumina; forming an agglomerate of said co-mulled mixture; and calcining said agglomerate in air without added steam under calcination conditions to thereby provide said non-impregnated catalyst composition.

5. A catalyst composition as recited in claim 1, wherein said total pore volume of the catalyst composition is in the range of from 0.75 to 1 cc/g.

6. A catalyst composition as recited in claim 5, wherein said molybdenum component is present in said catalyst composition in the range of from 8 wt. % to 10 wt. % and said weight ratio of said nickel component-to-said molybdenum component is in the range of from 0.27 to 0.8.

7. A process for the hydroconversion of a heavy hydrocarbon feedstock, wherein said process comprises: contacting under suitable hydroconversion conditions said heavy hydrocarbon feedstock with the catalyst composition of claim 1.

8. A catalyst composition, comprising:
a calcined agglomerate of a co-mulled mixture of alumina powder, which has a material absence of phosphorus and consists essentially of alumina, a nickel compound, and a molybdenum compound,
wherein said calcined agglomerate comprises: a molybdenum component present in an amount in the range of from greater than or equal to 5 wt. % to 11 wt. %,
wherein the wt. % is based on the total weight of said calcined agglomerate and assuming said molybdenum component is in the oxide form (i.e., MoO3) regardless of its actual form; and a nickel component present in said calcined agglomerate in an amount such that said calcined agglomerate has a weight ratio of said nickel component-to-said molybdenum component exceeding 0.25,
wherein said weight ratio is computed assuming said nickel component and said molybdenum component are each in their oxide form (i.e., NiO and MoO3) regardless of their actual forms, and
wherein said calcined agglomerate has a total surface area in the range of from 240 m2/g to 360 m2/g, a total pore volume in the range of from 0.7 cc/g to 1.05, and a pore size distribution such that from 11.8% to 30.5% of the total pore volume is present in macropores of diameter greater than or equal to 250 Å, and having a pore size distribution such that from 50% to 80% of the total pore volume of said catalyst composition is present as pores having diameters in the range of from 55 Å to 115 Å.

9. A catalyst composition as recited in claim 8, wherein said catalyst composition has a total pore volume and a pore diameter distribution whereby from 55% to 80% of the total pore volume of said catalyst composition is present as pores of diameter in the range of from 55 Å to 115 Å, from 19.5% to 37% of the total pore volume of said catalyst composition is present as pores having diameters of at least 160 Å, and having a pore size distribution such that from 50% to 80% of the total pore volume of said catalyst composition is present as pores having diameters in the range of from 55 Å to 115 Å.

10. A method of making a catalyst composition, wherein said method comprises:
mixing alumina powder, which has a material absence of phosphorus and consists essentially of alumina, a nickel compound, and a molybdenum compound to provide a co-mulled mixture;
forming an agglomerate of said co-mulled mixture; and
heat-treating said agglomerate to provide said catalyst composition;
wherein an amount of said alumina powder, an amount of said nickel compound and an amount of said molybdenum compound provided in said mixing step are such that said catalyst composition contains a molybdenum component present therein in an amount of greater than or equal to 5 wt. % and less than 11 wt. %, with the wt. % being based on the total weight of said catalyst composition and assuming said molybdenum component is in the oxide form (MoO3) regardless of its actual form, and a nickel component present in said catalyst composition in an amount such that said catalyst composition has a weight ratio of said nickel component-to-said molybdenum component exceeding 0.25, with said weight ratio being computed assuming said nickel component and said molybdenum component are each in the oxide form regardless of their actual forms, and wherein said catalyst composition has a total surface area in the range of from 240 m²/g to 360 m²/g, a total pore volume in the range of from at least 0.65 cc/g to 1.1 cc/g and a pore size distribution such that from 11% to 30.5% of the total pore volume is present in macropores of diameter greater than or equal to 250 Å, and having a pore size distribution such that from 50% to 80% of the total pore volume of said catalyst composition is present as pores having diameters in the range of from 55 Å to 115 Å.

11. A catalyst composition comprising:
alumina powder that has a material absence of phosphorus and consists essentially of alumina;
a molybdenum component in an amount in the range of from 5 wt. % to 11 wt. %, with the wt. % being based on the total weight of said catalyst composition and assuming said molybdenum component is in the oxide form (MoO3) regardless of its actual form; and
a nickel component present in an amount such that said catalyst composition has a weight ratio of said nickel component-to-said molybdenum component exceeding 0.25, with said weight ratio being computed assuming said nickel component and said molybdenum component are each in the oxide form regardless of their actual forms, and wherein said catalyst composition has a total surface area in the range of from 240 m²/g to 360 m²/g, and a pore size distribution such that from 11.8% to 30.5% of the total pore volume is present in macropores of diameter greater than or equal to 250 Å and no more than 0.3 cc/g of total pore volume is present in macropores of a diameter greater than or equal to 250 Å.

12. A catalyst composition as recited in claim 11, having a pore size distribution such that from 50% to 80% of the total pore volume of said catalyst composition is present as pores of diameter in the range of from 55 Å to 115 Å, and from 18% to 28% of the total pore volume of said catalyst composition is present in pores of diameter greater than 500 Å.

13. A catalyst composition as recited in claim 12, wherein the catalyst composition is prepared by mixing said alumina powder, a nickel compound, and a molybdenum compound to provide a co-mulled mixture, comprising said nickel compound, said molybdenum compound and alumina; forming an agglomerate of said co-mulled mixture; and calcining said agglomerate in air without added steam under calcination conditions to thereby provide said catalyst composition.

14. A catalyst composition, comprising:
a calcined agglomerate of a co-mulled mixture of alumina powder, which has a material absence of phosphorus and consists essentially of alumina, a nickel compound, and a molybdenum compound;
wherein said calcined agglomerate comprises:
- a molybdenum component present in an amount of greater than or equal to 5 wt. % and less than 11 wt. %, wherein the wt. % is based on the total weight of said calcined agglomerate and assuming said molybdenum component is in the oxide form (i.e., $MoO_3$) regardless of its actual form; and
- a nickel component present in said calcined agglomerate in an amount such that said calcined agglomerate has a weight ratio of said nickel component-to-said molybdenum component exceeding 0.25, wherein said weight ratio is computed assuming said nickel component and said molybdenum component are each in their oxide form (i.e., NiO and $MoO_3$) regardless of their actual forms, and
- wherein said calcined agglomerate has a total surface area in the range of from 240 $m^2/g$ to 360 $m^2/g$, a total pore volume in the range of from 0.7 cc/g to 1.05 cc/g, and a pore size distribution such that from 11% to 30.5% of the total pore volume is present in macropores of diameter greater than or equal to 250 Å, and wherein said catalyst composition has a total pore volume and a pore diameter distribution whereby from 50% to 62.8% of the total pore volume of said catalyst composition is present as pores of diameter in the range of from 55 Å to 115 Å, from 20% to 30.5% of the total pore volume of said catalyst composition is present as pores having diameters greater than or equal to 160 Å.

15. A catalyst composition as recited in claim 14, wherein said total pore volume of the catalyst composition is in the range of from 0.75 to 1 cc/g.

16. A method of making a catalyst composition, wherein said method comprises:
mixing alumina powder, which has a material absence of phosphorus and consists essentially of alumina, a nickel compound, and a molybdenum compound to provide a co-mulled mixture;
forming an agglomerate of said co-mulled mixture; and
heat-treating said agglomerate to provide said catalyst composition;
wherein an amount of said alumina powder, an amount of said nickel compound and an amount of said molybdenum compound provided in said mixing step are such that said catalyst composition contains a molybdenum component present therein in an amount greater than or equal to 5 wt. % and less than 11 wt. %, with the wt. % being based on the total weight of said catalyst composition and assuming said molybdenum component is in the oxide form ($MoO_3$) regardless of its actual form, and a nickel component present in said catalyst composition in an amount such that said catalyst composition has a weight ratio of said nickel component-to-said molybdenum component exceeding 0.25, with said weight ratio being computed assuming said nickel component and said molybdenum component are each in the oxide form regardless of their actual forms, and wherein said catalyst composition has a total surface area in the range of from 240 $m^2/g$ to 360 $m^2/g$, a total pore volume in the range of from 0.75 cc/g to 1 cc/g and a pore size distribution such that from 11% to 30.5% of the total pore volume is present in macropores of diameter greater than or equal to 250 Å.

\* \* \* \* \*